United States Patent [19]

Tuchiya

[11] 4,419,799
[45] Dec. 13, 1983

[54] CUTTING TOOL DRIVING APPARATUS FOR A LATHE

[76] Inventor: Yoshifumi Tuchiya, 6 of 1373, Baigo 6, Ohme-Shi, Tokyo, Japan

[21] Appl. No.: 343,381

[22] Filed: Jan. 27, 1982

[51] Int. Cl.$^3$ ............................................. B23B 21/00
[52] U.S. Cl. .................................. 29/37 A; 82/21 A; 82/24 R; 82/25
[58] Field of Search ................ 82/19, 24 R, 25, 2.5, 82/21 A; 29/27 A, 37 A

[56] References Cited

U.S. PATENT DOCUMENTS

| | | | |
|---|---|---|---|
| 3,315,550 | 4/1967 | Kylin | 82/25 |
| 3,448,643 | 6/1969 | Kylin | 82/21 A |
| 3,744,355 | 7/1973 | Flisch | 82/25 |
| 3,811,346 | 5/1974 | Nomura | 82/25 |
| 4,072,071 | 2/1978 | Sato et al. | 82/21 A |
| 4,078,459 | 3/1978 | Phillips | 82/21 A |
| 4,304,159 | 12/1981 | Tsuchiya | 29/37 A |

Primary Examiner—Leonidas Vlachos
Assistant Examiner—Jerry Kearns
Attorney, Agent, or Firm—Fidelman, Wolffe & Waldron

[57] ABSTRACT

A radial cutting tool driving apparatus for a lathe comprises oppositely disposed first and second sliders supported slidably on a frame, and adapted for moving to or away from the work positioned therebetween, a servo motor and a ball screw and nut assembly which drive the first slider, a first piston and cylinder assembly provided in the first slider, and having a piston secured at one end to the second slider, an arm supported rotatably on the frame, a second piston and cylinder assembly provided intermediate the ends of the arm, and including a piston having one end engaging the first slider, a cam follower attached to one end of the arm, and engaging the second slider, and springs urging the second slider away from the first slider.

3 Claims, 4 Drawing Figures

CUTTING TOOL DRIVING APPARATUS FOR A LATHE

BACKGROUND OF THE INVENTION

1. Field of the Invention

This invention relates to an apparatus for driving cutting tools radially in a lathe. More particularly, it is concerned with an improvement in the driving apparatus comprising a pair of oppositely disposed tool rests mounted on a slider, and between which work is positioned.

2. Description of the Prior Art

Oppositely disposed tool rests for an automatic lathe having a movable headstock are known, as they are, for example, disclosed in U.S. Pat. No. 3,811,346 to Takayuki Nomura. Referring to FIG. 1 (prior art), a frame 2 secured to a bed 1 supports a slider 3 which is slidable radially of work W. A pair of tool rests 6a and 6b are disposed opposite to each other in the slider 3, and the work W is positioned between the tool rests. The slider 3 is driven by a servo motor 4 and a ball screw and nut assembly 5 to move the tool rests radially of the work W.

In the apparatus as hereinabove described, it is better to shorten the traveling stroke of the cutting tools, hence the slider 3 as far as possible in order to reduce the overall size of the machine, and the time required for changing the cutting tools. This consideration, however, brings about a disadvantage when one of the tool rests 6a and 6b is replaced by a milling or cross drilling device which requires a considerably greater stroke of movement. The stroke of movement designed for the tool rests 6a and 6b is not sufficient for the movement of the cutting tools in the milling or drilling device. If the slider 3 is designed for movement over a greater distance to suit the milling or drilling device, the cutting tool on the remaining tool rest moves along an unnecessarily long distance.

SUMMARY OF THE INVENTION

In view of the aforesaid problems, it is an object of this invention to provide a cutting tool driving apparatus for a lathe which is compact in construction, enables quick changing of cutting tools, and makes it possible to employ a milling or cross drilling device, or the like which requires a greater stroke of movement, while keeping the traveling stroke of the cutting tools for grinding purposes at a minimum.

According to this invention, there is, thus, provided a radial cutting tool driving apparatus for a lathe which comprises first and second sliders disposed opposite to each other, and supported slidably on a frame, work being positioned between the first and second sliders; a servo motor and a ball screw and nut assembly which drive the first slider; a first piston and cylinder assembly provided in the first slider, and having a piston secured at one end to the second slider; an arm supported rotatably on the frame; a second piston and cylinder assembly provided intermediate the ends of the arm, and having a piston having one end engaging the first slider; a cam follower attached to one end of the arm, and engaging the second slider; and spring means urging the second slider away from the first slider.

DETAILED DESCRIPTION OF THE INVENTION

Figure 1:
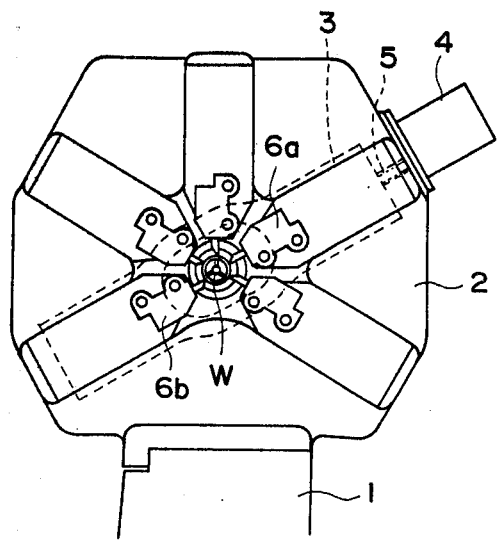
FIG. 1 is a view showing known oppositely disposed tool rests for an automatic lathe having a movable headstock.
Figure 2:
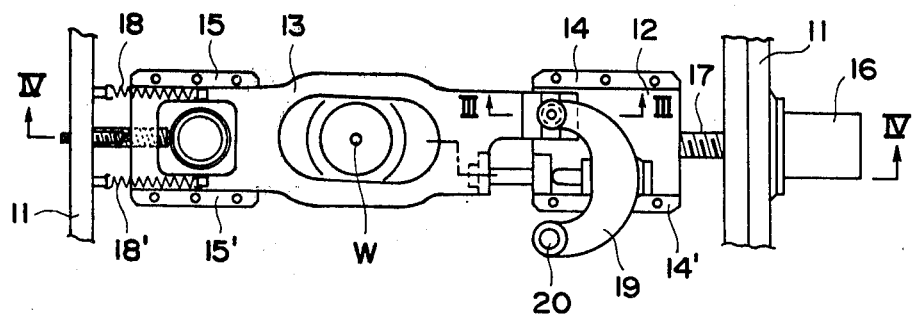
FIG. 2 is a front elevational view of a cutting tool driving apparatus for a movable headstock automatic lathe embodying this invention.

Referring to FIG. 2, there is shown a cutting tool driving apparatus embodying this invention. FIG. 2 shows the apparatus as viewed from the opposite side of FIG. 1. A first slider 12 and a second slider 13, between which work W is positioned, are supported on a frame 11, and are slidable radially of the work W along guides 14 and 14', and 15 and 15', respectively. A servo motor 16 is mounted on the frame 11 to drive the first slider 12 in conjunction with a ball screw and nut assembly 17. The second slider 13 has one end fastened to a pair of springs 18 and 18' attached to the frame 11. The springs 18 and 18' urge the second slider 13 away from the first slider 12 (to the left in FIG. 2). An arm 19 is supported on the frame 11 rotatably about a pivot 20. The arm 19 is operationally engageable with the second slider 13 upon clockwise rotation by virtue of a mechanism which will hereinafter be described with reference to FIG. 3.

Figure 3:
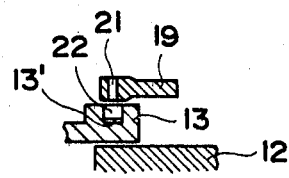
FIG. 3 is a sectional view taken along the line III—III of FIG. 2.

Referring to FIG. 3, a cam follower 22, which is rotatable about a pin 21, is attached to one end of the arm 19. The cam follower 22 is engaged in a groove 13' provided at the other end of the second slider 13.

Figure 4:
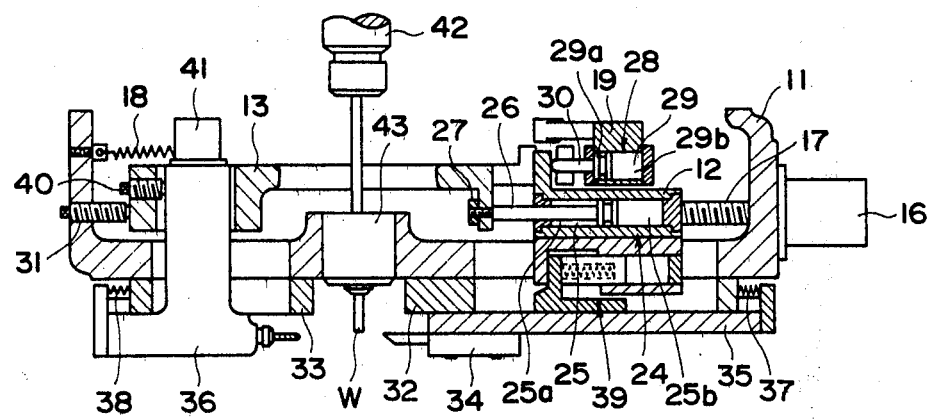
FIG. 4 is a sectional view taken along the line IV—IV of FIG. 2.

A first piston and cylinder assembly 24 is provided in the first slider 12, and includes a piston 26 having one end secured to the other end of the second slider 13 by a nut 27, while the other end of the piston 26 is accommodated in a cylinder 25, as shown in FIG. 4. A second piston and cylinder assembly 28 is provided intermediate the ends of the arm 19, and includes a piston 30 having one end engaging an L-shaped end projection of the first slider 12, and adapted to push the first slider 12 toward the second slider 13, while the other end of the piston 30 is accommodated in a cylinder 29. The piston 30 engages the L-shaped end projection of the first slider 12 at a point which is equally spaced apart from both the pivot 20 and the cam follower 22, as is obvious from FIG. 2. The springs 18 and 18' maintain the second slider 13 in its retracted position which is defined by a positioning screw 31 threadedly engaged with the frame 11.

The frame 11 is of the box-shaped construction, and slide bases 32 and 33, which correspond to the first and second sliders 12 and 13, respectively, are secured on the outside of the frame 11. The slide bases 32 and 33 include dovetail joints, or the like, and slidably support a tool slide 35 carrying a tool rest 34, and a drilling unit 36, respectively. Springs 37 and 38 are provided for urging the tool slide 35 and drilling unit 36, respectively, away from the work W. The tool slide 35 is connected to the first slider 12 by a third piston and cylinder assembly 39 secured to the slider 12, and which is known as is disclosed, for example, U.S. Pat. No. 3,811,346. The drilling unit 36 is held against a positioning screw 40 threadedly engaged with the second slider 13. The drilling unit 36 is known in the art, and driven by a motor 41. A headstock 42 holds the work W, and is axially movable. A guide bushing 43 supports the work W rotatably.

The head of the piston 26 in the first piston and cylinder assembly 24 divides the cylinder 25 into two chambers 25a and 25b. A hydraulic fluid acts in the left chamber 25a, while the right chamber 25b is always left at atmospheric pressure. The cylinder 29 in the second piston and cylinder assembly 28 is likewise divided into two chambers 29a and 29b, but a hydraulic fluid acts in both of the left and right chambers 29a and 29b. A hydraulic fluid is, however, not introduced into the cylinder chambers 25a and 29b simultaneously.

Referring to FIG. 4, the cylinder chamber 29b of the second piston and cylinder assembly 28 is filled with a hydraulic fluid, and the first piston and cylinder assembly 24 is in its inoperative position. When the apparatus is in this position, the second slider 13 is capable of traveling over twice as large a stroke as that of the first slider 12. If the first slider 12 is moved to the right in FIG. 4 by operation of the servo motor 16, the L-shaped end projection of the slider 12 pushes back the piston 30, whereby the arm 19 is rotated clockwise, and the cam follower 22 moves the second slider 13 to the right. The second slider 13 moves to the right along half as large a distance as the first slider 12, since the distance between the pivot 20 and the piston 30 is twice as large as the distance between the pivot 20 and the cam follower 22 as already set forth. If the slider 12 is moved to the left, the slider 13 also moves to the left under the action of the springs 18 and 18' over twice as large a distance as the slider 12. The relationship between the distances of movement of the sliders 12 and 13 depends on the relationship between the distance between the pivot 20 and the cam follower 22.

If the cylinder chambers 25a and 29a are supplied with a hydraulic fluid simultaneously, the movement of the piston 26 causes the front end of the second slider 13 to abut on the first slider 12, whereby the sliders 12 and 13 move together along the same distance. If the cylinder chamber 29a is supplied with a hydraulic fluid, while no hydraulic fluid is supplied into the cylinder chamber 25a, the second slider 13 does not move irrespective of the movement of the first slider 12.

As is obvious from the foregoing description, this invention makes it selectively possible to move the second slider along a greater distance than the first slider as desired, move the two sliders together along the same distance, or maintain the second slider in its inoperative position despite the movement of the first slider. In other words, it is possible in accordance with this invention to employ various types of tools for different purposes in combination with the second slider, and obtain an optimum distance of movement for each individual tool. Therefore, the apparatus of this invention effectively shortens the time required for the change of the cutting tools, and reduce the overall size of the machine in which it is employed.

While the invention has been described with reference to a preferred embodiment thereof, it is to be understood that modifications or variations may be easily made by anybody of ordinary skill in the art without departing from the scope of this invention which is defined by the appended claims. For example, this invention is also applicable to a radial cutting tool driving apparatus for a lathe having a stationary headstock. The invention is not limited to an apparatus having oppositely disposed tool rests, but it is, of course, possible to eliminate the tool rest from the first slider. It is possible to employ any other ratio between the distances of movement of the two sliders. The hydraulic operation of the various piston and cylinder assemblies may be effected in any other appropriate manner than has hereinbefore been described.

What is claimed is:

1. A radial cutting tool driving apparatus for a lathe, which comprises:
    first and second sliders disposed opposite to each other, and supported slidably on a frame, work being positioned between said first and second sliders;
    a servo motor and a ball screw and nut assembly adapted to drive said first slider;
    a first piston and cylinder assembly provided in said first slider, and having a piston secured at one end to said second slider;
    an arm supported rotatably on said frame;
    a second piston and cylinder assembly provided intermediate the ends of said arm, and including a piston having one end engaging said first slider and a cylinder mounted on said arm;
    a cam follower attached to one of said ends of said arm, and engaging said second slider; and
    spring means urging said second slider away from said first slider.

2. An apparatus as set forth in claim 1, wherein the other end of said arm is rotatably supported by a pivot on said frame, and wherein said piston of said second piston and cylinder assembly engages said first slider at a point which is equally spaced apart from both said pivot and said cam follower.

3. An apparatus as set forth in claim 2, further including two slide bases secured to said frame for mounting slidably thereon a tool slide carrying a tool rest, and a drilling unit, respectively.

* * * * *